June 30, 1953 W. M. WISE 2,643,872
HYDRAULIC LIFT SCALE
Filed May 4, 1948

INVENTOR.
WILLIAM M. WISE
BY
ATTORNEY

Patented June 30, 1953

2,643,872

UNITED STATES PATENT OFFICE 2,643,872

HYDRAULIC LIFT SCALE

William M. Wise, Royal Oak, Mich.

Application May 4, 1948, Serial No. 25,006

14 Claims. (Cl. 265—47)

This invention relates to improvements in weighing scales and more particularly to a weighing scale of the tension type especially adapted for use with cranes.

An object of the invention is to provide a scale in which the number of moving parts have been reduced to a minimum and the frictional resistance of such moving parts has been practically eliminated.

Another object of the invention is to provide a recording instrument associated with the pressure transmitting medium, acted upon by the load being measured, and to provide an adjustable safety device, operable in conjunction with the pressure medium, for preventing excessive strains on the recording instrument.

A further object of the invention is to provide a hydraulically operated instrument for recording extremely high pressures up to a predetermined load, after which the hydraulic pressure is relieved and the device is operable through a direct connection between the source of power and the load.

Other objects and advantages of the invention will more fully appear from the following description taken in connection with the accompanying drawings in which.

Figure 1:
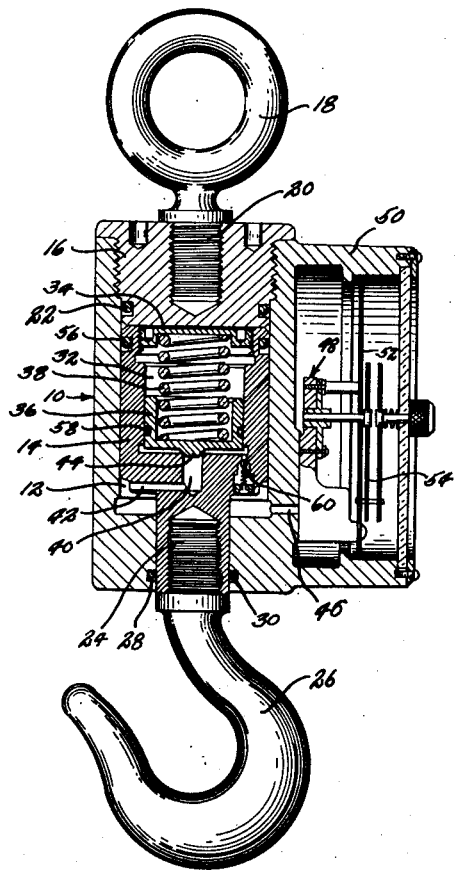
Fig. 1 is a vertical sectional view through my improved weighing scale, parts being shown in elevation.
Figure 2:
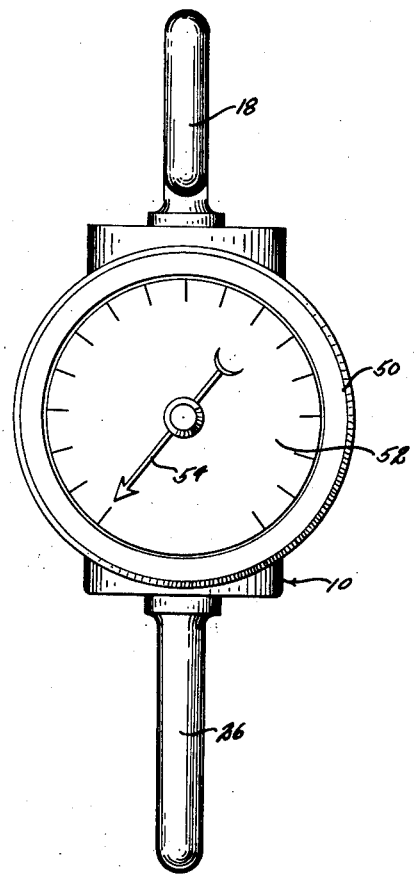
Fig. 2 is a front elevational view of the device shown in Fig. 1.
Figure 3:
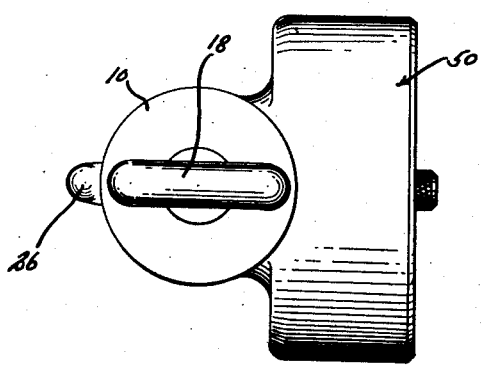
Fig. 3 is a top plan view of Fig. 1.

Referring to the drawings, the improved scale consists of a unit adapted to be positioned as a link in the cable of a crane, or the like, between the source of power and the load.

The device comprises a housing 10 having a cylindrical bore 12 therein in the form of a cylinder for receiving a piston 14. The open end of the bore 12 is provided with a screw threaded cap 16 which closes the open end after the piston 14 has been inserted in the cylinder. A ring 18 having a screw threaded projection 20 is adapted to be screw threaded into the cap 16 for attaching a cable or the like to the device. A sealing ring 22 is carried in the outer periphery of cap 16 for tightly closing the open end of the cylinder. The piston 14 has an outwardly projecting cylindrical portion 24 which extends through the opposite end of the housing 10 and it receives a threaded hook 26 for attaching a cable or the like at the side of the housing opposite to the ring 18. The housing 10 is provided with a groove 28, around the cylindrical portion 24 for receiving a sealing ring 30.

The piston 14 is free for limited axial movement within the cylinder 12, such movement being determined by the opposing forces between the ring 18 and the hook 26. The bottom of the cylinder 12 limits the movement of the piston in one direction and the cap 16 limits the movement of the piston in an opposite direction.

The piston 14 has a bore 32 therein and the upper end of the piston is open having a removable cap 34 screw threaded therein. A piston 36 is reciprocable in the bore 32 of the piston 14 and is urged downwardly in the bore 32 by a compression spring 38 between the piston 36 and the cap 34.

A fluid passage 40 is provided in the piston 14, intersecting a passage 42 forming a fluid passage from the bore 32 in the piston 14 to the opposite end of the piston into the lower portion of the cylinder 12. The piston 36 has its head provided with a tapered edge projection 44 which serves as a valve for closing the passage 40 when the valve is seated by the pressure of the spring 38.

The resistance of the compression spring 38 is predetermined and may be adjusted within limits by the screwthreaded position of the cap 34. The lower end of the cylinder 12 contains a fluid, preferably oil, which is acted upon by piston 14. A transverse passage 46 forms a communication between the cylinder 12 and a fluid pressure gauge, designated generally by the numeral 48. This gauge is carried at one side of the housing 10, an integral housing 50 being formed on the housing 10 having a dial 52 and indicating hand 54. The gauge unit 48 is positioned with its fluid opening in registration with the passage 46 so that fluid pressure within the cylinder 12 is transmitted to the gauge and the pressure indicated on the dial by the hand 54.

Fluid sealing gaskets 56 and 58 are provided in the outer peripheries of the pistons 14 and 36 respectively for preventing any fluid leak from one side of the piston to the other.

A one way by-pass valve 60 is provided in the piston 14 for conducting fluid from the cylinder 32, below the piston 36, to the cylinder 12 when the valve 44 is closed and the pressure in the cylinder 32, below the piston 36 exceeds the pressure in the cylinder 12.

The purpose of the dual piston construction is to weigh articles within maximum predetermined loads and to automatically reduce the pressure on the gauge after a pressure has exceeded the predetermined pressure. This prevents injury to the gauge through overloads.

The compression force of the spring 38 is selected equal to maximum pressure desired to be applied to the gauge. Minor adjustments may be obtained by turning the cap 34 into or out of the cylinder 32 thereby varying the compression force of the spring 38.

In operation of the scale, a weight is secured to the hook 26 and a lift applied to the ring 18. This causes a force to be applied to the fluid in the cylinder 12, between the piston 14 and the bottom of the cylinder 12, which force is communicated to the gauge 48 through the passage 46 and the reading taken on the dial 52. If this force is greater than the compression force of the spring 38 the valve 44 unseats and the fluid flows past the valve into the cylinder carrying the piston 36.

The fluid in the cylinder 32 is preferably air and is compressed by the excessive pressure. This causes the piston 14 to move downwardly until the head of the piston 14 comes in contact with the bottom wall of the cylinder 12 where the weight is taken directly from the piston 14, through the housing 10 to the source of lift, ring 18. The gauge, under this condition registers zero.

When the weight is removed, the compression spring 38 reseats the valve 44 and the fluid in the cylinder 32 is admitted into the cylinder 12 through the one-way valve 60, the piston moving upwardly into contact with cap 16 ready for another load to be applied to the device.

While I have illustrated and described a preferred embodiment of the invention it will be understood that various changes including the size, shape and arrangement of parts may be made without departing from the spirit of my invention and it is not my intention to limit its scope other than by the terms of the appended claims.

I claim:

1. A weighing scale comprising a housing having a closed pressure cylinder therein, a piston within the pressure cylinder and movable relative thereto, a fluid pressure medium within said cylinder between said piston and one end wall of the cylinder, a fluid pressure gauge in communication with the pressure medium, said piston having a closed air pressure chamber therein, a pressure release valve for admitting fluid under pressure through said piston from the pressure cylinder to the air chamber when the pressure in said cylinder rises above a predetermined value, and a check valve in said piston for returning the fluid from the air chamber to the pressure cylinder.

2. A weighing scale comprising, a housing having a cylinder therein, a piston within the cylinder and movable relatively thereto, a piston rod carried by said piston, two suspending means, one connected to said piston rod and the other to said housing, a pressure transmitting liquid filling a head chamber in the cylinder between said piston and an end wall of said housing, a pressure indicating gauge communicating with the liquid, means including wall portions defining a fully enclosed cushioning chamber separate from said head chamber but communicating therewith independently of the position of the piston, a pressure relief valve normally preventing communication between said head chamber and cushioning chamber and openable by the pressure in the head chamber when the pressure in the head chamber exceeds a predetermined value.

3. A weighing scale comprising, a housing having a closed cylinder therein, a piston within the cylinder and movable relative thereto; a piston rod carried by said piston and projecting beyond the end of said housing, two suspending means, one connected to said piston rod and the other to said housing, a pressure transmitting liquid completely filling a head chamber in the cylinder between said piston and an end wall of said housing, a pressure indicating gauge having free communication with the liquid, wall portions defining a fully enclosed cushioning chamber separate from said head chamber but communicating therewith independently of the position of the piston, a pressure relief valve normally preventing communication between said head chamber and cushioning chamber and openable by the pressure in the head chamber when the pressure in the head chamber exceeds a predetermined value, and spring means biasing said valve to closed position against the pressure in said head chamber.

4. A weighing scale comprising, a housing having a closed cylinder therein, a piston within the cylinder and movable relative thereto; a piston rod carried by said piston and projecting beyond the end of said housing, two suspending means, one connected to said piston rod and the other to said housing, a pressure transmitting liquid completely filling a head chamber in the cylinder between said piston and an end wall of said housing, a pressure indicating gauge having free communication with the liquid, wall portions defining a fully enclosed cushioning trap chamber, a pressure relief valve normally preventing communication between said head chamber and cushioning chamber and openable by the pressure in the head chamber when the pressure in the head chamber exceeds a predetermined value, resilient means biasing said valve to closed position against the pressure in said head chamber and supplemental fluid-pressure actuatable biasing means in fluid-conductive communication with said cushioning chamber and mechanically connected to the valve and responsive to fluid pressure in the cushioning chamber to alter the effective bias on the valve.

5. A weighing scale comprising, a housing having a cylinder therein, a piston within the cylinder and movable relatively thereto, a piston rod carried by said piston, two suspending means, one connected to said piston rod and the other to said housing, a pressure transmitting liquid filling a head chamber in the cylinder between said piston and an end wall of said housing, a pressure indicating gauge having free communication with the liquid in said head chamber, wall portions defining a fully enclosed cushioning chamber contained within the piston separate from said head chamber but communicating therewith regardless of the position of the piston, a pressure relief valve normally preventing communication between said head chamber and cushioning chamber portion openable by the pressure in the head chamber when the pressure in the head chamber exceeds a predetermined value.

6. A weighing scale comprising, a housing having a cylinder therein, a piston within the cylinder and movable relative thereto, a piston rod carried by said piston, two suspending means, one connected to said piston rod and the other to said housing, a pressure transmitting liquid filling a head chamber in the cylinder between said piston and an end wall of said housing, a pressure indicating gauge having free communication with the liquid in said head chamber, wall portions defining a fully enclosed cushioning chamber contained within the piston separate from said head chamber but communicating therewith regardless of the position of the piston, a pressure relief valve also carried by the piston and normally preventing communication between said head chamber and cushioning chamber portion openable by the pressure in the head chamber when the pressure in the head chamber exceeds a predetermined value.

7. A weighing scale comprising, a housing having a cylinder therein, a piston within the cylinder and movable relatively thereto, a piston rod carried by said piston, two suspending means, one connected to said piston rod and the other to said housing, a pressure transmitting liquid filling a head chamber in the cylinder between said piston and an end wall of said housing, a pressure indicating gauge communicating with the liquid in said chamber, means including wall portions defining a fully enclosed cushioning chamber separate from said head chamber but communicating therewith independently of the position of the piston, a pressure relief valve normally preventing communication between said head chamber and cushioning chamber portion and openable by the pressure in the head chamber when the pressure in the head chamber exceeds a predetermined value, said cushioning chamber and said valve are carried by the piston, and a supplemental pressure-exerting element interiorly communicating with said cushioning chamber and movable to exert pressure upon liquid therein.

8. A weighing scale comprising, a housing having a cylinder therein, a piston within the cylinder and movable relatively thereto, a piston rod carried by said piston, two suspending means, one connected to said piston rod and the other to said housing, a pressure transmitting liquid filling a head chamber in the cylinder between said piston and an end wall of said housing, a pressure indicating gauge communicating with the liquid in said chamber, means including wall portions defining a fully enclosed cushioning chamber separate from said head chamber but communicating therewith independently of the position of the piston, a pressure relief valve normally preventing communication between said head chamber and cushioning chamber portion and openable by the pressure in the head chamber when the pressure in the head chamber exceeds a predetermined value, said cushioning chamber portion and said valve are carried by the piston, and a supplemental pressure-exerting element interiorly communicating with said cushioning chamber and movable to exert pressure upon liquid therein, said valve being carried by said pressure-exerting element.

9. A weighing scale comprising, a housing having a cylinder therein, a piston within the cylinder and movable relatively thereto, a piston rod carried by said piston, two suspending means, one connected to said piston rod and the other to said housing, a pressure transmitting liquid filling a head chamber in the cylinder between said piston and an end wall of said housing, a pressure indicating gauge communicating with the liquid in said chamber, means including wall portions defining a fully enclosed cushioning chamber separate from said head chamber but communicating therewith independently of the position of the piston, a pressure relief valve normally preventing communication between said head chamber and cushioning chamber portion and openable by the pressure in the head chamber when the pressure in the head chamber exceeds a predetermined value, said cushioning chamber portion is formed in the piston, a supplemental piston in said first-mentioned piston and movable in said cushioning chamber to exert pressure on liquid therein, said valve comprising a valving portion carried by said supplemental piston and movable therewith to open and close communication between the head chamber and the cushioning chamber.

10. A weighing scale comprising, a housing having a cylinder therein, a piston within the cylinder and movable relatively thereto, a piston rod carried by said piston, two suspending means, one connected to said piston rod and the other to said housing, a pressure transmitting liquid filling a head chamber in the cylinder between said piston and an end wall of said housing, a pressure indicating gauge communicating with the liquid in said chamber, means including wall portions defining a fully enclosed cushioning chamber separate from said head chamber but communicating therewith independently of the position of the piston, a pressure relief valve normally preventing communication between said head chamber and cushioning chamber portion and openable by the pressure in the head chamber when the pressure in the head chamber exceeds a predetermined value, said trap chamber portion is formed in the piston, a supplemental piston in said first-mentioned piston and movable in said cushioning chamber to exert pressure on liquids therein, said valve comprising a valving portion carried by said supplemental piston and movable therewith to open and close communication between the head chamber and the cushioning chamber, and spring means in said first-mentioned piston and reacting against the supplemental piston to urge the latter in a direction to exert pressure on liquid in the cushioning chamber and thereby to urge said liquid back into the head chamber and simultaneously to urge said valve toward closed position to isolate said chambers.

11. A weighing scale comprising, a housing having a cylinder therein, a piston within the cylinder and movable relatively thereto, a piston rod carried by said piston, two suspending means, one connected to said piston rod and the other to said housing, a pressure transmitting liquid filling a head chamber in the cylinder between said piston and an end wall of said housing, a pressure indicating gauge communicating with a liquid, means including wall portions defining a fully enclosed cushioning chamber separate from said head chamber but communicating therewith independently of the position of the piston, a pressure relief valve normally preventing communication between said head chamber and said cushioning chamber and openable by the pressure in the head chamber when the pressure in the head chamber exceeds a predetermined value, and common means for pressurizing said cushioning chamber and for urging said valve toward the closed position in which it prevents communication between said chambers.

12. A weighing scale comprising, a housing having a cylinder therein, a piston within the cylinder and movable relatively thereto, a piston rod carried by said piston, two suspending means, one connected to said piston rod and the other to said housing, a pressure transmitting liquid filling a head chamber in the cylinder between said piston and an end wall of said housing, a pressure indicating gauge communicating with a liquid, means including wall portions defining a fully enclosed cushioning chamber separate from said head chamber but communicating therewith independently of the position of the piston, a pressure relief valve normally preventing communication between said head chamber and said cushioning chamber and openable by the pressure in the head chamber when the pressure in the head chamber exceeds a predetermined value, and common means for pressurizing said cushioning chamber and for urging said valve toward the closed position in which it prevents communication between said chambers including a piston, said valve being operable by said piston.

13. A weighing scale comprising, a housing having a cylinder therein, a piston within the cylinder and movable relatively thereto, a piston rod carried by said piston, two suspending means, one connected to said piston rod and the other to said housing, a pressure transmitting liquid filling a head chamber in the cylinder between said piston and an end wall of said housing, a pressure indicating gauge communicating with a liquid, means including wall portions defining a fully enclosed cushioning chamber separate from said head chamber but communicating therewith independently of the position of the piston, a pressure relief valve normally preventing communication between said head chamber and said cushioning chamber and openable by the pressure in the head chamber when the pressure in the head chamber exceeds a predetermined value, and common means for pressurizing said cushioning chamber and for urging said valve toward the closed position in which it prevents communication between said chambers including a piston, said valve being mechanically connected to and operable by said piston, said piston having an area exposed within said cushion chamber and exceeding the area upon which the pressure in the head chamber may act to urge said valve toward the open position.

14. A weighing scale comprising, a housing having a cylinder therein, a piston within the cylinder and movable relatively thereto, a piston rod carried by said piston, two suspending means, one connected to said piston rod and the other to said housing, a pressure transmitting liquid filling a head chamber in the cylinder between said piston and an end wall of said housing, a pressure indicating gauge communicating with a liquid, means including wall portions defining a fully enclosed cushioning chamber separate from said head chamber but communicating therewith independently of the position of the piston, a pressure relief valve normally preventing communication between said head chamber and said cushioning chamber and openable by the pressure in the head chamber when the pressure in the head chamber exceeds a predetermined value, and common means for pressurizing said cushioning chamber and for urging said valve toward the closed position in which it prevents communication between said chambers including a piston having an area exposed within the interior of said cushioning chamber and operative to exert pressure upon liquid within said cushioning chamber, said valve being carried by said piston and having a reduced area less than said exposed area of the piston, said reduced area being exposed to the pressure in the head chamber.

WILLIAM M. WISE.

References Cited in the file of this patent

UNITED STATES PATENTS

| Number | Name | Date |
|---|---|---|
| 2,304,363 | Johansen | Dec. 8, 1942 |
| 2,304,402 | Faulkner | Dec. 8, 1942 |

FOREIGN PATENTS

| Number | Country | Date |
|---|---|---|
| 9,351 | Great Britain | July 1, 1887 |
| 13,238 | Great Britain | June 7, 1913 |
| 202,366 | Great Britain | Aug. 7, 1923 |